US008482394B2

(12) United States Patent
Nass et al.

(10) Patent No.: US 8,482,394 B2
(45) Date of Patent: Jul. 9, 2013

(54) MOTOR VEHICLE DOOR LOCK HAVING A CIRCUIT ARRANGEMENT

(75) Inventors: Ulrich Nass, Muelheim/Ruhr (DE); Thorsten Bendel, Oberhausen (DE); Matthias Ochtrop, Dorsten (DE)

(73) Assignee: Kiekert AG, Heiligenhaus (DE)

( * ) Notice: Subject to any disclaimer, the term of this patent is extended or adjusted under 35 U.S.C. 154(b) by 140 days.

(21) Appl. No.: 13/054,050

(22) PCT Filed: Aug. 3, 2009

(86) PCT No.: PCT/DE2009/001073

§ 371 (c)(1),
(2), (4) Date: Apr. 21, 2011

(87) PCT Pub. No.: WO2010/015236

PCT Pub. Date: Feb. 11, 2010

(65) Prior Publication Data

US 2011/0187519 A1 Aug. 4, 2011

(30) Foreign Application Priority Data

Aug. 5, 2008 (DE) ..................... 20 2008 010 423 U

(51) Int. Cl.
*B60Q 1/00* (2006.01)

(52) U.S. Cl.
USPC ........ 340/438; 292/201; 292/216; 292/336.3; 340/455

(58) Field of Classification Search
USPC ................ 340/438, 455; 292/201, 216, 336.3
See application file for complete search history.

(56) References Cited

U.S. PATENT DOCUMENTS

| | | | | |
|---|---|---|---|---|
| 4,896,637 | A | 1/1990 | Yamamoto | |
| 5,901,991 | A * | 5/1999 | Hugel et al. | 292/201 |
| 6,469,545 | B2 | 10/2002 | Murr | |
| 7,155,603 | B2 | 12/2006 | Ilg | |
| 7,589,431 | B2 | 9/2009 | Hentsch | |
| 2002/0050841 | A1 * | 5/2002 | Murr | 327/20 |

FOREIGN PATENT DOCUMENTS

| | | | |
|---|---|---|---|
| DE | 4414734 | A | 11/1996 |
| DE | 19643947 | A | 5/1998 |
| DE | 10034866 | A | 2/2002 |
| FR | 2778939 | A | 11/1999 |
| GB | 2309481 | A | 7/1987 |
| GB | 2309481 | * | 7/1997 |
| JP | 2001049952 | A | 2/2001 |

* cited by examiner

*Primary Examiner* — Daniel Wu
*Assistant Examiner* — Vishak Ganesh
(74) *Attorney, Agent, or Firm* — Andrew Wilford

(57) ABSTRACT

The invention relates to a motor vehicle door lock, comprising a circuit arrangement having at least one sensor (5) and a connected control unit (7), wherein the sensor (5) has at least two switching states ("open" and "closed"), which correspond to varying current intensity ($I_1$; $I_2$) at the output of said sensor and are detected by the control unit (7), and the two switching states ("open" and "closed") of the sensor (5) belong to different current paths (6*a*; 6*a*, 6*b*) of a line network (6) and/or to different voltage states of an output line.

10 Claims, 2 Drawing Sheets

MOTOR VEHICLE DOOR LOCK HAVING A CIRCUIT ARRANGEMENT

CROSS REFERENCE TO RELATED APPLICATIONS

This application is the US-national stage of PCT application PCT/DE2009/001073, filed 3 Aug. 2009, published 11 Feb. 2010 as 2010/015236, and claiming the priority of German patent application 202008010423.8 itself filed 5 Aug. 2008, whose entire disclosures are herewith incorporated by reference.

FIELD OF THE INVENTION

The invention relates to a motor-vehicle door latch comprising an electrical circuit with at least one sensor and a connected controller, the sensor having at least two switch positions that correspond to different current levels at its output and that can be detected by the controller.

BACKGROUND OF THE INVENTION

Such a motor-vehicle door latch is described, for example, in DE 196 43 947 A1. Here, a so-called Hall-effect sensor chip is used, i.e. an electronic unit that can provide different current levels at its output and does so specifically depending on the proximity of an associated magnet. Such Hall-effect sensor chips are frequently used if, for example, the position of a latch fork in a motor-vehicle door latch is to be determined. In fact, such a motor-vehicle door latch is comprised of the two essential components, the door latch and the respective door bolt.

To the extent the door bolt engages a locking mechanism consisting of the latch fork and retaining pawl in the motor-vehicle door latch during closing of the respective motor-vehicle door, the latch fork is displaced: It first attains a prelocking position and then goes into the final locked position. The respective positions can be determined with the aid of the Hall-effect sensor chip or several such Hall-effect sensor chips and unambiguously detected by the controller. This is successful due to the association of the different current levels at the output of the sensor and/or Hall-effect sensor chip with the respective positions of the latch fork that are to be determined in the particular case.

Hall-effect sensor chips of this kind have certain disadvantages. They have a transient response which is due to the fact that the supply voltage of the Hall-effect sensor chip is normally pulsed. Due to the transient response behavior, the current signal emitted by the sensor and/or Hall-effect sensor can only be reliably analyzed by the controller with a delay. In light of the quick reaction times required today, this is a disadvantage. In addition, the Hall-effect sensor chips are relatively expensive and can malfunction. Malfunctions are due to the fact that the magnetic flow density of the respective magnet decreases because of external influences, age, mechanical damage, etc., and consequently, the at least two switch positions that are to be registered are no longer correctly present, or cannot be distinguished from one another.

Various methods are known in the prior art and from other contexts to the effect of working with switches and resistors in a latch (compare GB 2 309 481). Beyond that, it is known from JP 2001049952 to use a drive controller for a motor for opening and closing a motor-vehicle door with switches and resistors. But convincing suggestions for solving the above-cited problems are not seen here.

OBJECT OF THE INVENTION

The object of invention is to further develop a generic motor-vehicle door latch to obtain improved response behavior while reducing the design and consequently financial expense compared to previous embodiments.

SUMMARY OF THE INVENTION

This object is attained in a generic motor-vehicle door latch in accordance with the invention in that the two or more switch positions of the sensor are associated with different current paths of a line network and/or different voltage levels of an output line.

Of course, with the help of the sensor, more than two switch positions can be determined if needed. As a rule it is however sufficient to safely detect only two switch positions that correspond to respective different current levels at the output of the sensor and can thus be surely detected by the controller and associated with respective operating conditions that are to be determined. These operating conditions and/or switch positions may, in the example of a latch fork, be the positions of "prelocking position reached", and "prelocking position not reached." Of course, this is to be understood as being only an example.

In accordance with the invention, a simple on/off switch, or microswitch is advantageously used as sensor. With the help of this on/off microswitch, different current paths of a line network are defined. A supply voltage is fed to this line network. Depending on which current path of the line network is active—(specified by the on/off sensor switch)—the current level that is detected by the controller and that flows through the line network changes.

In principle, the two switch positions of the sensor can also be different voltage levels of an output line. These different voltage levels of the output line can be realized by a voltage selection that occurs by sensor actuation. Thus, it is conceivable, for example, that the an on/off sensor switch works through and/or activates a (DC/DC) voltage selector and as a consequence once again different current levels flow through the output line and are detected by the controller and associated with the respective switch positions. This means that in this case, only the voltage selector, the sensor and a (single) output line are sufficient.

As a rule, however, the two switch positions of the sensor correspond to different line-network current paths that are active depending on the specification by the sensor, respectively, the on/off switch. In this connection it has been shown to be effective when the current paths of the line network have different electrical resistances. To the system works with an essentially constant supply voltage, these different resistances automatically ensure that at the output of the line network different current levels are generated that in turn are detected by the controller and associated with the switch positions.

This means that the effect of the sensor on the line network depends on the switch position of the sensor making different current paths available. These current paths serve for current flow from one terminal of the power supply through the line network and/or the active current path through the controller to the other terminal of the power supply. The supply voltage is customarily direct current, in particular low voltage in the range of approximately 9 volt to 15 volt, as is used in general in a motor vehicle. But in principle a higher supply voltage of up to 30 volt to 40 volt is also conceivable.

As a rule, the sensor switches between two current paths exist in the line network. This way, the first switch position of the sensor connects through the first current path and the second switch position of the sensor through the second current path.

In particular it is advantageous if the line network has an output line with a first resistor for a first current path and a second shunt resistor connected in parallel. If the shunt second resistor is used, two parallel lines are formed in the line network and form the second current path (consisting of the two lines). Thus the sensor ensures that the second shunt resistor is added to the output line with the first resistor. The mode of operation and/or differentiation between the first current path with the first resistor and the second current path with the first and the second resistors is constructed similar and functions comparable to a current meter where the measurement ranges are preselected by individual shunts.

In any event, in the first switch position of the sensor, the current flows only through the first resistor (first current path). In contrast, if in the second switch position of the sensor the second resistor is added as shunt by connection of the two parallel lines, the current flows through both the first and the second resistor (second current path) to produce a decrease of the total resistance and an increase of the current level (with a generally uniform supply voltage).

In order to reduce the standby current overall through the line network and to avoid potential overheating, the system is energized by pulsed voltage. This way, the voltage supply may, for example, work at a duty cycle of 0.5 or 50%. This means that the on time and the off time each take approximately half of the total duty cycle of the supply voltage. This is normally done with a square-wave voltage, even though other voltage curves are also usable with the invention, of course.

In order to keep costs as low as possible and to simplify installation, it has been shown to be effective when the sensor and the line network form a single modular component. This means that the sensor and essentially the two resistors are generally made as one part, which ensures—at the desired location in the interior of the motor-vehicle door latch directly—the required determination of operating conditions and the switch positions. The two resistors may be conventional carbon-film resistors, and, of course, semiconductor types can also be used according to the invention. In principle, capacitive resistors can also be used.

For the remainder, the invention is specifically applicable to a motor vehicle in that, depending on the supply voltage, each switch position of the sensor falls within a specific current range. This means that the controller accepts and interprets anything within a certain current range as belonging to a switch position. Furthermore, the current ranges of the two switch positions do not overlap but rather, are separated from each other by a current-free range. The size of the range that is free of current may correspond to the that of each of current-level ranges.

As a result, the motor-vehicle door latch is provided with an electrical circuit that relies on a reliable sensor, most of the time in the form of an on/off switch. The on/off switch is advantageously coupled with a line network that makes at least two different current levels and/or two different current ranges available at the output. These current levels and/or current ranges can easily be detected by the controller.

As a consequence of this, the electrical circuit in accordance with the invention that has the sensor and/or micro switch does not practically differentiate itself in its behavior on the input side and the output side from the behavior that is observed in the case of a Hall-effect sensor chip. This means that the electrical circuit that is realized within the scope of the invention can substitute for a Hall-effect sensor chip.

This is successful in a simple and cost effective way. Beyond that, pulsing of the supply voltage does not have any influence on the switching characteristics of the sensor and/or on/off switch. Namely, it does not create a transient response. Rather, the different current ranges are created for the switch positions, which merely occur due to perhaps different supply voltage. This represents the important advantages.

BRIEF DESCRIPTION OF THE DRAWING

In the following, the invention is explained in more detail with reference to a drawing showing a single embodiment. Therein.

DETAILED DESCRIPTION OF THE INVENTION

Figure 1:
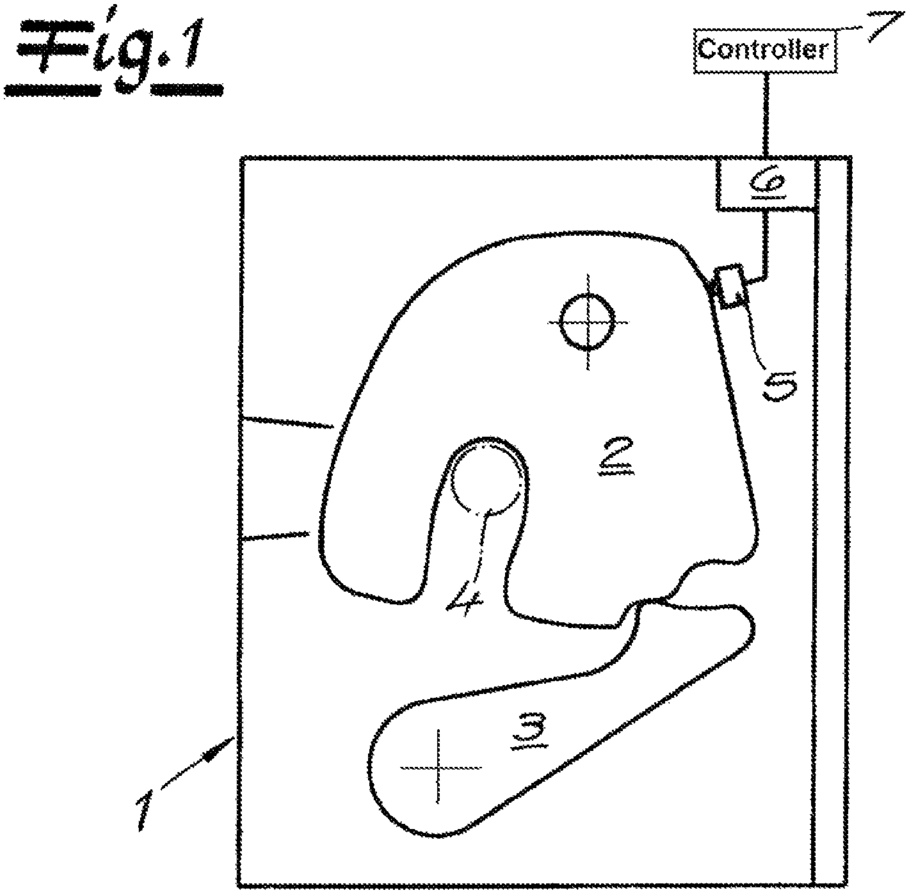
FIG. 1 is a schematic view of the motor-vehicle door latch.

FIG. 1 illustrates the main features of a motor-vehicle door latch. It consists of a latch housing 1, a pivotal latch fork 2, and a retaining pawl 3 in the latch housing 1. Further, the fundamental structure also includes a door bolt 4, which is only suggested. With the help of a sensor 5, various positions of the latch fork 2 can now be determined.

Figure 2:
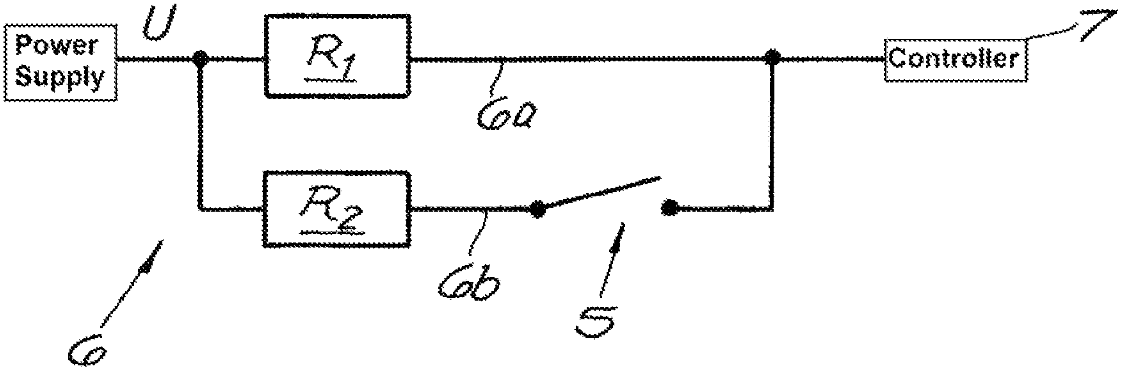
FIG. 2 shows the line network in a general view.

To do so, the sensor 5 is connected with a controller 7 by means of a line network 6. Here, the sensor 5 is an on/off switch 5 as indicated in FIG. 2 and has two switch positions, namely switch 5 "open" and switch 5 "closed". These two switch positions of the sensor 5 respectively correspond to current levels $I_1$ and $I_2$ at the output of the sensor 5 or at the output of the line network 6. The controller 7 can detect these different current levels $I_1$ and $I_2$ at the output and associate operating conditions to the latch fork 2, for example, "prelocking position reached" or "prelocking position not reached".

In accordance with the invention, the two switch positions of the sensor on/off switch 5 belong to two different current paths **6*a* and 6*b* of the line network 6 in this embodiment. The two current paths 6*a* and 6*a*, 6*b* of the line network 6 have respective different electrical resistors $R_1$ and $R_1+R_2$. The different resistors $R_1$ and $R_1+R_2$ cause—with an essentially constant supply voltage U—the different current levels $I_1$ and $I_2$ that are analyzed by the controller 7**.

In fact, the sensor on/off switch 5 here switches between the two current paths **6*a* and 6*a*, 6*b*. These current paths 6*a* and 6*a*, 6*b* are formed by an output line 6*a* with the first resistor $R_1$ for the first current path 6*a*. With the help of the on/off sensor switch 5, the second resistor $R_2$ is added as a shunt resistor. As a result, current flows not only through the output line 6*a*, but also through the parallel line 6*b* with the second resistor $R_2$. Both lines 6*a* and 6*b* form the second current path 6*a* and 6*b* (see FIG. 2**).

Figure 3:
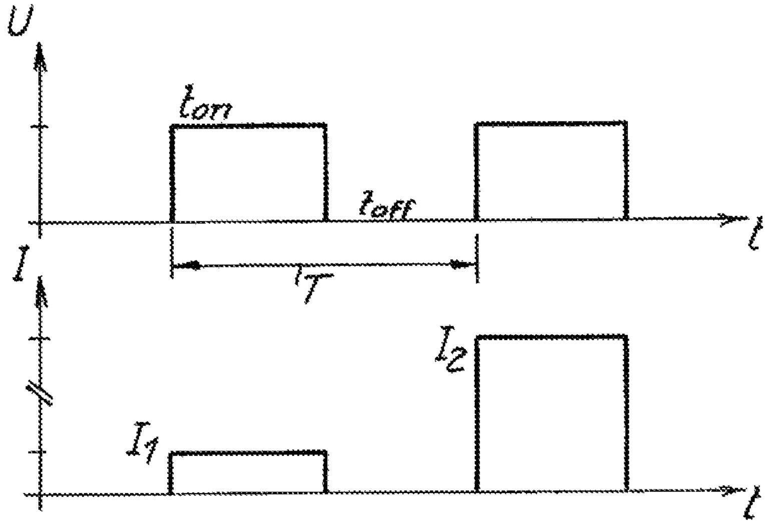
FIG. 3 a time graph of the voltage supply and the switch positions of the sensor belonging to it, and last

The upper part of FIG. 3 shows that a supply voltage U is pulsed. In this the embodiment, the supply voltage U has a duty cycle of approximately 0.5 or 50%. The duty cycle thereby indicates the quotient of switched-on time $t_{on}$ to cycle duration T, i.e. $t_{on}/T$. This applies in the present case to the relationship of switched-off time $t_{off}$ relative to the cycle time T. As a consequence of the different current levels $I_1$, $I_2$ at the output of the line network 6—depending on whether the on/off switch 5 is closed or not—the current sequences on the bottom of FIG. 3 below occur over time t. Thus, on the lower left of FIG. 3 bottom, the on/off switch 5 is open and the result is the lower current level $I_1$. On the lower right, the on/off switch 5 is closed and produces the higher current strength $I_2$.

Figure 4:
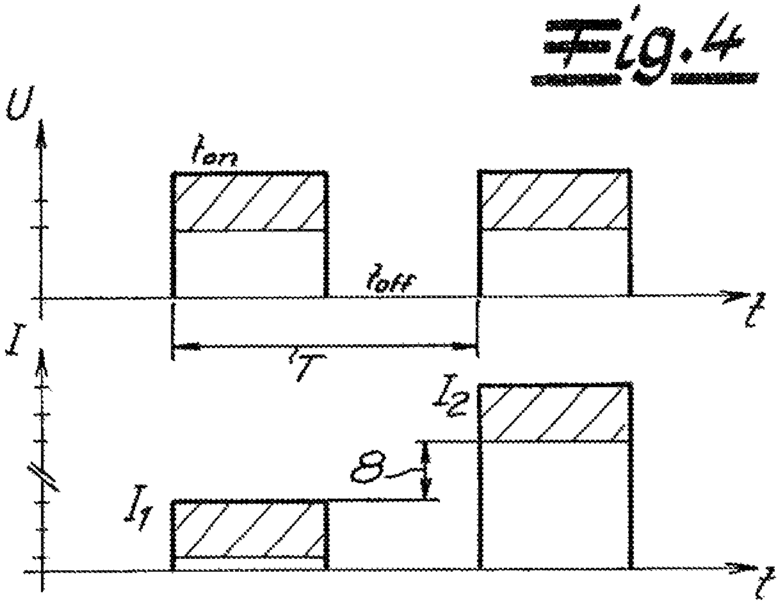
FIG. 4 shows the various switch positions relative to the is respective current ranges.

Finally, the upper part of FIG. 4 shows the chronological progression of the supply voltage U by considering a variation of the supply current. Because of this variation of the supply voltage U (shown hatched) a current range also results, as shown in the lower part. This also hatched current range belongs to the respective switch position, on the one hand on/off switch "open" (current level $I_1$), and on the other hand, on/off switch "closed" (current level $I_2$). The illustration is thus comparable with that in FIG. 3 bottom with the only difference that now, due to the varying supply voltage U, a current range is reflected that is overall (still) interpreted as belonging to the respective switch position by the controller 7.

Between the two current ranges $I_1$ and $I_2$ belonging to the switch positions "open" and "closed" there is a so-called current-free range 8 that corresponds in its dimensions essentially to the current-level variation and thus makes a definitive differentiation possible between the switch positions "open" and "closed" in the controller 7.

In the present case, the supply voltage U may range between 9 volt and 15 volt. The proper current level for on/off switch 5 in its position "closed" may be between approximately 14 mA and 23 mA. In contrast, if the on/off switch 5 is "open" a current level in the range of approximately 3 mA and 5 mA results at the output of line network 6. Consequently, the current-free range 8 extends between approximately 5 mA and 14 mA. These are, of course, only examples.

The invention claimed is:

1. In combination:

a motor-vehicle door latch having at least two operational positions;

a motor-vehicle power supply providing a pulsed output voltage;

an electrical controller responsive to the two positions of the latch;

a sensor switch connected to the power supply, receiving the output voltage therefrom, and having a voltage-conducting on position and a nonconducting off position, the switch being operatively connected to the latch such that each of the switch positions corresponds to a respective one of the latch positions; and a subcircuit having two branches connected between the switch and the controller and connected in the positions by the sensor switch to the power supply so as to create in each of the positions of the switch a respective output current lying within a respective current range, the branches being of different respective resistances such that one of the current ranges is above the other of the ranges and has a lowermost current level that is substantially higher than an uppermost current level of the other range and separated therefrom by a current-free range.

2. The combination defined in claim 1 wherein the subcircuit produces different voltages corresponding to the current ranges.

3. The combination defined in claim 1 wherein the branches of the subcircuit hold respective resistors of different resistances.

4. The combination defined in claim 3 wherein the switch is connected in series with one of the resistors.

5. The combination defined in claim 4 wherein the switch and the one resistor are connected in series with each other and together in parallel to the other resistor, whereby when the switch is open the voltage flows only through the other resistor.

6. The combination defined in claim 1 wherein the voltage pulses regularly with an on time to generally equal to an off time.

7. The combination defined in claim 1 wherein on the current ranges move on variation of the output voltage of the power source while remaining separated by the current-free range.

8. The combination defined in claim 1 wherein the sensor is a microswitch.

9. The combination defined in claim 1 wherein the current-free range is at least as large as one of the current ranges.

10. The combination defined in claim 1 wherein both current ranges are above zero.

* * * * *